March 14, 1939.  R. E. CONOVER  2,150,265

MOTOR CONTROL SYSTEM

Filed Dec. 18, 1935  4 Sheets-Sheet 1

INVENTOR
RICHARD E. CONOVER
BY Brockett, Hyde, Higley & Meyer
ATTORNEYS

March 14, 1939. R. E. CONOVER 2,150,265
MOTOR CONTROL SYSTEM
Filed Dec. 18, 1935 4 Sheets—Sheet 2

INVENTOR
RICHARD E. CONOVER
BY Brockett, Hyde, Higley & Meyer
ATTORNEYS

March 14, 1939.     R. E. CONOVER     2,150,265
MOTOR CONTROL SYSTEM
Filed Dec. 18, 1935     4 Sheets-Sheet 3

INVENTOR
RICHARD E. CONOVER
BY Brockett, Hyde, Higley & Meyer
ATTORNEYS

March 14, 1939.   R. E. CONOVER   2,150,265
MOTOR CONTROL SYSTEM
Filed Dec. 18, 1935    4 Sheets-Sheet 4

INVENTOR
RICHARD E. CONOVER
BY Brockett, Hyde, Higley & Meyer
ATTORNEYS

Patented Mar. 14, 1939

2,150,265

UNITED STATES PATENT OFFICE 2,150,265

MOTOR CONTROL SYSTEM

Richard E. Conover, Dayton, Ohio

Application December 18, 1935, Serial No. 55,053

10 Claims. (Cl. 172—239)

My invention relates to electrical circuits for controlling the speed or direction, or both the speed and direction, of direct current motors from an alternating current source of power. More particularly my invention relates to circuits including one or more ignition controlled discharge tubes and means for controlling the grid bias of such tubes.

In certain operations, such as in amusement devices or in power drive control, it is often desirable to operate direct current motors from an alternating source of power. It may also be desirable to change the direction of rotation, the speed or both the direction and speed. I have provided an improved circuit in which current may be supplied to a direct current motor from an alternating source of power, and by means of a simple operation the supply of current to the motor may be cut off or power may be supplied to the motor in such a manner that the motor may be operated in either direction at the desired speed.

It is therefore an object of my invention to provide a circuit including one or more ignition control discharge tubes and improved means for regulating the grid bias of the tube to supply current to the motor, to increase or decrease the speed of the motor, or to cut off the supply of current to the motor.

Another object of my invention is to provide an improved circuit for operating direct current motors, including a plurality of ignition controlled discharge tubes and means for controlling the discharge of such tubes so that current will be supplied to the motor in such a manner that the motor may be operated in either direction and at the desired speed.

Other objects of my invention will be apparent as the description proceeds.

My invention will be better understood by reference to the accompanying drawings, in which.

Figure 1:
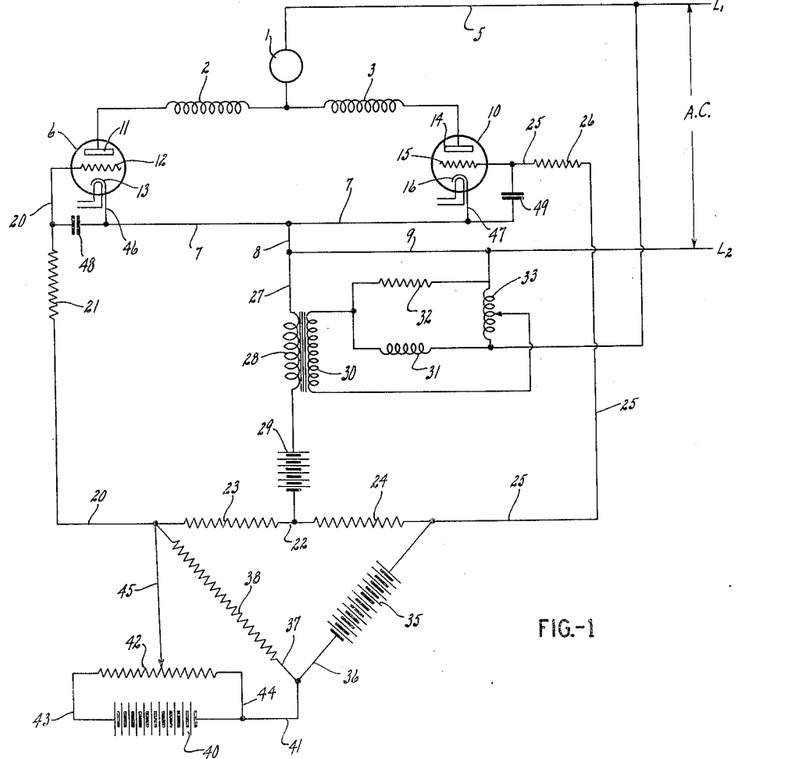
Fig. 1 is an improved circuit, showing means operated by direct current for controlling the grid bias of ignition discharge tubes to supply current from an alternating source to a direct current motor.
Figure 2:
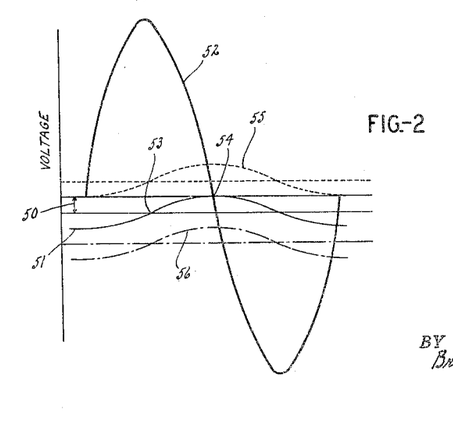
Fig. 2 is a series of curves showing the relationship between the plate, battery and grid voltages of the circuit shown in Fig. 1 during a complete cycle.

Referring to Figs. 1 and 2 of the drawings, the circuit comprises a direct current motor 1 to which current is supplied from lines L1, L2 which is an alternating source of power. Motor 1 is series wound and has a double field comprising coils 2 and 3. The motor is connected to the lines L1 and L2 by conductor 5, field coil 2, ignition controlled discharge tube 6 and conductors 7, 8 and 9. The motor is also connected to the lines L1 and L2 through conductor 5, field coil 3, ignition control discharge tube 10 and conductors 7, 8 and 9.

Ignition controlled discharge tube 6 is provided with an anode plate 11, a grid 12 and a cathode 13 and ignition discharge tube 10 is provided with an anode plate 14, a grid 15 and a cathode 16. The ignition controlled discharge or gridglow tubes 6 and 10 are of the usual type and contain a vapor such as argon, helium, mercury, neon or caesium and are preferably of the hot type, as illustrated.

The grid of the tube 6 is connected through conductor 20 and resistor 21 to one end of a divided resistor 22 which is composed of resistance elements 23 and 24 and a conductor 25 leads from the other end of the resistor 22 through resistor 26 to the grid 15 of tube 10.

A conductor 27 leading from the junction of conductors 8 and 9 is connected in series with the secondary coil 28 of a transformer and to the positive terminal of a source of potential, such as a battery 29. The primary winding 30 of the transformer is supplied with current from the lines L1 and L2 through a circuit comprising an inductance coil 31, a resistor 32 and a variable inductance coil 33. By this arrangement the phase of the voltage induced in the secondary coil 28 may be adjusted to lag the plate voltage by 90°. The peak value of the voltage of coil 28, however, is never greater, although it may be less than the voltage of battery 29.

The negative terminal of battery 29 is connected to the central portion of the resistor 22 which is composed of resistance elements 23 and 24. The positive terminal of a source of potential, such as a battery 35, is connected to the conductor 25 and the negative terminal of battery 35 is connected through conductors 36 and 37 to a resistor 38, the other terminal of resistor 38 being connected to conductor 20.

The negative terminal of a source of potential, such as a battery 40, is connected to conductors 36 and 37 by means of a conductor 41, the positive terminal of the battery 40 being connected through a potentiometer 42 and conductors 43 and 44 to conductor 41. A conductor 45 leads from the potentiometer 42 to the conductor 20.

As illustrated, the cathodes 13 and 16 of tubes 6 and 10 are connected to the conductor 7 by conductors 46 and 47, respectively. A condenser 48 is connected in the circuit between the junction of conductors 46 and 7 and the conductor 20. In a like manner, a condenser 49 is connected in the circuit between the junction of the conductor 47 with the conductor 7 and the conductor 25.

The operation of the circuit to control the supply or cut off current to the motor 1 will be apparent from Fig. 1 of the drawings, taken in conjunction with the graph shown in Fig. 2 in which the ordinate designates voltage and the abscissa the time of a complete cycle.

Referring to Fig. 2, the vertical line 50 designates the voltage of battery 29 and the curve 51 designates the sum of the voltage of battery 29 and the voltage induced in coil 28. As indicated in the graph, the maximum voltage induced in the coil 28 is equal to the battery voltage. As illustrated, at the start of the cycle the voltage of the coil 28 is of the same polarity as the battery voltage and both grids 12 and 15 of tubes 6 and 10 are therefore at a negative bias with respect to their cathodes. When the plate voltage 52 reaches its maximum, the voltage of coil 28 commences to oppose the voltage of battery 29, as indicated by the numeral 53. When the voltage of the coil 28 reaches its maximum value as indicated by the numeral 54, the voltage of the coil 28 is equal and opposite to the battery voltage. Consequently, the potential across the divided resistor 22 is zero, the induced voltage in the coil 28 is opposing the voltage of battery 29 and the grid bias of both tubes 6 and 10 will be zero with respect to their cathodes. At all other times in the cycle, however, the grid bias will be negative.

If the potentiometer 42 is so adjusted, however, that the voltage across resistor 38 is greater than the voltage of battery 35, the left end of the resistor, which is connected to grid 12, will be positive during the cycle and the bias of grid 12 with respect to its cathode will also be positive. Current will therefore flow from the line L1 through the motor 1, the tube 6 and through the conductors 7, 8 and 9 to the line L2. The starting speed of the motor may be controlled by gradually adjusting the potentiometer 42 from the zero potential position, as indicated by the point 54 on curve 51, to the desired amount. For example, the maximum amount may be designated by the curve 55 which will produce a maximum speed of the motor. When the grid 12 is positive with respect to its cathode, the grid 15 is negative with respect to its cathode, as indicated by the curve 56 of Fig. 2.

When it is desired to operate the motor in the opposite direction, potentiometer 42 is adjusted so that the voltage across resistor 38 is less than the battery voltage 35. A difference of potential is thus produced across the resistor 22, the positive side being to the right of the resistor 24. The grid voltage 15 thus becomes positive with respect to its cathode and a circuit is established from line L1, motor 1, field coil 3, tube 10 and conductors 8 and 9 to line L2. The speed of the motor may be controlled by adjusting the potentiometer gradually as in the previous example, the maximum speed of the motor being produced when the potential produced at the left hand side of the resistor 23 is at the minimum. A graph illustrating this would be the same as that shown in Fig. 2 with the exception that lines 55 and 56 would be reversed.

Figure 3:
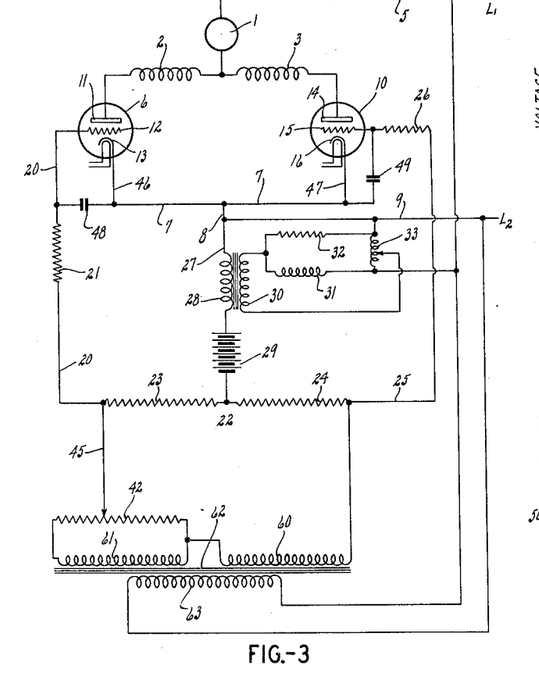
Fig. 3 is a circuit similar to Fig. 1 in which the grid bias of the ignition discharge tube is controlled by means of alternating current voltage.

The circuit illustrated in Fig. 3 is the same as shown in Fig. 1 with the exception that in place of batteries 35 and 40 a source of alternating current is employed for controlling the grid bias of discharge tubes 6 and 10. The same reference numerals have accordingly been applied to the main portion of the circuit.

As illustrated in Fig. 3, coils 60 and 61 which form the secondary winding of transformer 62 are utilized in place of batteries 35 and 40, respectively. The primary coil 63 of the transformer is connected across the lines L1 and L2 and, consequently, the voltage induced in coils 60 and 61 will be in phase with the plate voltage. Coils 60 and 61 are wound in opposite directions so that the voltage induced in coil 60 opposes the voltage induced in coil 61. A potentiometer 42 is provided to adjust the voltage of coil 61.

Figure 4:
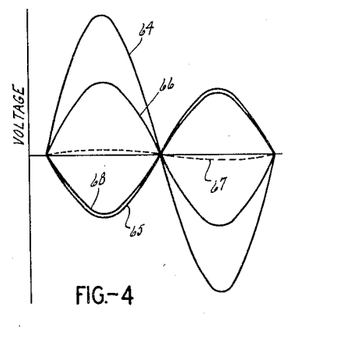
Fig. 4 is a graph, showing a series of curves designating the relationship between the voltages which control the ignition discharge tubes in the circuit shown in Fig. 3 during a complete cycle.

The operation of the circuit will be apparent from the graphs shown in Figs. 4, 5, 6, 7 and 8. As illustrated in Fig. 4, the voltage supplied by coil 61, which is designated by the curve 64 is opposed by the voltage of coil 60 which is designated by the curve 65. When a maximum voltage is supplied by coil 61, the difference between the voltages supplied by coil 61 and the voltage of coil 60 is designated by the curve 66. When a minimum voltage is supplied by coil 61, as indicated by the curve 67, the difference between the voltage supplied by coil 61 and the voltage of coil 60 is designated by the curve 68.

Figure 5:
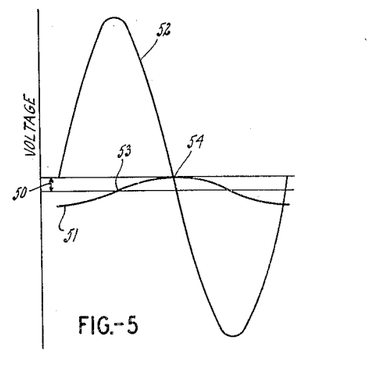
Fig. 5 is a similar graph in which the curves show the relationship between the plate voltage and the battery and alternating current voltages which maintain a negative or zero grid bias when the motor is at rest during a complete cycle.

When potentiometer 42 is so adjusted that the voltage induced in coil 60 is equal to the voltage supplied by coil 61, the relation of the plate voltage and the sum of the battery voltage and the voltage of coil 28 is shown in Fig. 5. These curves are similar to the corresponding curves of Fig. 2 and have correspondingly been designated by the same reference numerals. It will be noted that when the voltage of coil 60 is equal to the voltage supplied by coil 61, the grid bias is zero or negative with respect to its cathode. Motor 1 will therefore be at rest.

When the potentiometer 42 is adjusted so that the voltage supplied by coil 61 is greater than the voltage of coil 60, a difference of potential will exist across the resistor 22, the left hand end of the resistor will be positive when the plate voltage of tube 6 is positive, and the grid 12 will become positive with respect to its cathode. A circuit will thus be established from line L1 through the motor 1, tube 6 and conductors 7, 8 and 9 to line L2. When potentiometer 42 is so adjusted that the amount of voltage induced in coil 60 is greater than the voltage supplied by coil 61, a difference of potential will exist across resistor 22, the right hand side of the resistor will be positive when the plate voltage of tube 10 is positive and the bias of grid 15 will be positive with respect to its cathode. A circuit will thus be established from line L1 through motor 1, field coil 3, tube 10 and conductors 7, 8 and 9 to line L2.

Figure 6:
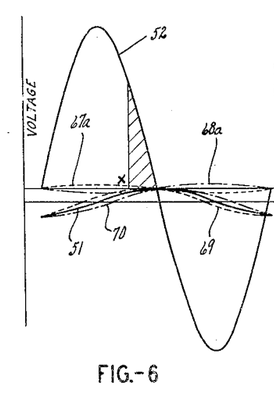
Figs. 6, 7 and 8 are graphs in which the curves show the relationship of the plate voltage, the battery voltage and the alternating current voltage when the grid of one of the discharge tubes is positive with respect to its cathode.
Figure 7:
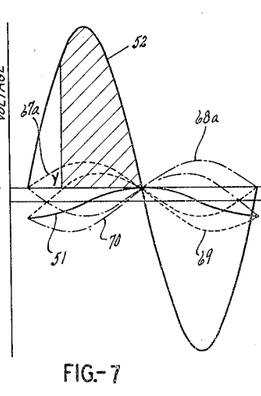
Figure 8:
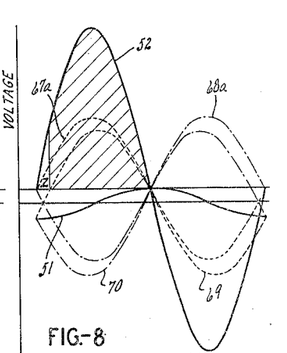

Figs. 6, 7 and 8 illustrate how the speed of the motor may be varied by different settings of the potentiometer 42 in the circuit shown in Fig. 3 of the drawings. In Fig. 6 the curve 67a designates the positive voltage formed at the left end of resistor 23 and the curve 68a designates the increased negative potential formed at the right hand side of resistor 24. Curves 67a and 68a are similar to curves 67 and 68 of Fig. 4 but designate only half the voltage on account of the division across resistor 22. Curve 51 is the same as that disclosed in Fig. 5 and designates the zero or negative grid bias produced by the coil 28 and the battery 29. Curve 69 designates the sum effect of the positive potential produced at the left hand end of resistance element 23, plus the negative or zero grid bias produced by the coil 28 and the battery 29, while curve 70 designates the negative grid bias produced at the right hand end of resistance element 24, plus the negative or zero grid bias produced by the battery 29 and the coil 28.

As will be apparent from the drawings, when the curve 69 becomes positive, a circuit is established from the line L1 through the motor 1, tube 6 and conductors 7, 8 and 9 to line L2, and a motor speed will be developed proportional to the voltage which is designated by the letter X. When the difference in potential across the resistor is increased so that the positive voltage at the left hand end of resistance element 23 is increased, as illustrated in Fig. 7 of the drawings, the motor will have a speed designated by the letter Y, which will be greater than the speed produced by the lower potential illustrated in Fig. 6. If the difference in potential is still further increased as illustrated in Fig. 8, the speed of the motor designated by the letter Z will be still greater than that designated by the letter Y.

When it is desired to reverse the direction of the motor, the potentiometer 42 is so set that a positive difference of potential across the resistor 22 will be produced at the right hand end of resistance element 24, and by varying the amount of this difference of potential the speed of the motor may be varied in the opposite direction.

Figures 9, 10, 11:
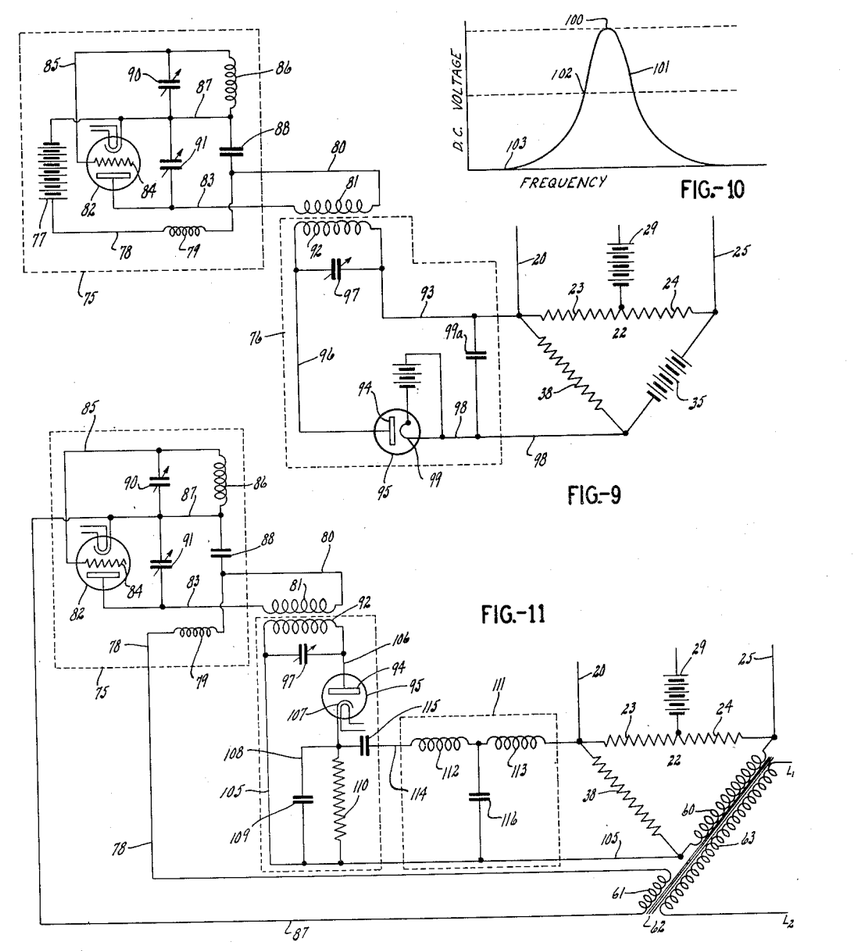
Fig. 9 is a view similar to Fig. 1 showing the use of an oscillator and receiver for controlling the grid bias of the ignition discharge tubes.
Fig. 10 is a curve showing the relationship between the frequency and the voltage produced by the circuit illustrated in Fig. 9.
Fig. 11 is a circuit similar to Fig. 9 in which the current is supplied to the oscillator from an alternating source of power.

In Fig. 9 of the drawings, modified means is shown for varying the potential at the left and right hand ends 23 and 24, respectively, of resistor 22. As illustrated in Fig. 9, a radio frequency oscillator 75 and a receiver 76 is provided. As illustrated in the drawings, current is supplied to the oscillator from a battery 77, the positive terminal of which is connected by conductor 78, radio frequency choke 79 and by conductor 80 to coil 81. The current then passes through conductor 83 and vacuum tube 82 to the negative terminal of the battery 77. The grid 84 of the tube is connected by conductor 85 to one terminal of inductance coil 86, the other terminal of inductance coil 86 being connected by conductor 87 to the cathode of tube 82 and the negative terminal of battery 77. Conductor 78 is also connected to coil 86 through condenser 88 which is located between the terminal of conductor 80 and coil 86. Variable condensers 90 and 91 are connected between conductors 85 and 87 and conductors 87 and 83, respectively.

Coil 92 of the receiver 76 is connected to one terminal of the resistor 38 through conductor 93 and to the plate 94 of rectifying tube 95 by the conductor 96. A variable condenser 97 is connected between conductors 93 and 96 and a conductor 98 leads from the cathode 99 of the tube to the opposite terminal of resistor 38. A condenser 99a is connected between conductors 93 and 98. The oscillator and receiver as just described are of conventional form and a more detailed explanation is therefore not considered necessary.

The operation of the oscillator and receiver to vary the potential at the opposite ends of resistor 22 will be apparent from Fig. 10 in which the ordinate designates the D. C. voltage imposed on resistor 38 and the abscissa designates the frequency. When the oscillator and receiver are in resonance, the voltage imposed on resistor 38 will be the maximum, as indicated by the point 100 on curve 101 which is greater than the voltage of battery 35. Current will thus flow through the resistor 22 from resistance element 23 to resistance element 24 and the grid 12, see Fig. 1, will become positive with respect to its cathode, thereby permitting current to flow through the tube. At this time the grid 15 will be negative with respect to its cathode 16.

When the variable condenser 97 is so adjusted that the potential at the opposite ends of resistor 22 are equal, no current will flow through resistor 22. The negative grid bias will therefore be maintained and the motor will be at rest. This voltage is indicated by the numeral 102 in Fig. 10.

If the variable condenser 97 is so adjusted that the difference of potential across the resistor 38 is less than the battery 35, current will flow from resistance element 24 to resistance element 23 and the potential at the right hand side of the resistor will be positive. This positive potential will also be impressed upon the grid 15 and a current will be established through the motor 1, tube 10 and conductors 7, 8 and 9 from the line L1 to the line L2. The maximum positive voltage impressed on the grid 15 may therefore be designated by the numeral 103 on the curve 101. It will therefore be seen that between the points 102 and 100 the voltage across the resistor 38 will be greater than the battery voltage and the motor will be driven in one direction. Between the points 102 and 103 the battery voltage will be greater than the voltage impressed on resistor 38 and the motor will be driven in the opposite direction. The speed of the motor will increase as the voltage across the resistor approaches the points 100 or 103 from the point 102, as illustrated in the graph.

In Fig. 11 a circuit is employed in which the difference of potential across the resistor is regulated by means of an oscillator and receiver as disclosed in Fig. 9. In place of the batteries 35 and 77, however, voltage is supplied by coils 60 and 61 which form the secondary winding of a transformer 62, the primary winding of which is connected across lines L1 and L2, as illustrated in Fig. 3 of the drawings. The oscillator, coil 92 and variable condenser 97 are the same as illustrated in Fig. 9 of the drawings and the parts have consequently been designated by the same reference numerals. As shown in the drawings, a conductor 105 leads from the coil 92 to one terminal of the resistor 38. Conductor 106 leads from the other terminal of the coil to the plate 94 of the rectifying tube 95. The cathode 107 of rectifier 95 leads to a conductor 108 which is connected to conductor 105 through a condenser 109 and a resistor 110 is also connected across conductors 108 and 105 in parallel with the condenser. The condenser 109 is for the purpose of bypassing the radio frequency.

A low pass filter 111 is also provided in which inductance coils 112 and 113 are connected in series through a conductor 114 and a condenser 115 with cathode 107, and a condenser 116 is connected from a point between coils 112 and 113 to conductor 105. Condenser 115 is for the purpose of preventing any direct current from passing to the resistor 38. In the low pass filter, the inductance reactance of coils 112 and 113 and the capacity reactance of condenser 116, at the line supply frequency are made equal to the resistance of resistor 38. Such a filter removes all of the higher harmonics of the impressed voltage as shown by curve 120 in Fig. 12. A sufficient number of filter sections are used to make the output voltage of the filter in phase with the voltage of coil 60.

Figure 12:
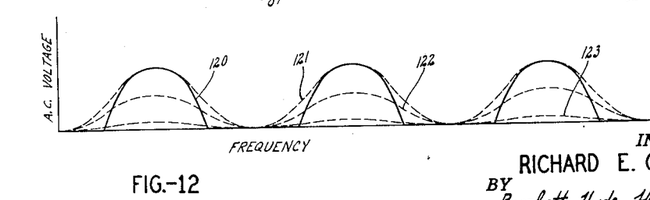
Fig. 12 is a graph showing the relationship of the frequency and the voltage of the circuit disclosed in Fig. 11.

The action of the filter will be apparent from Fig. 12 of the drawings in which the curve 120 designates the rectified current. The wave form of the rectified curent consists of the line supply frequency plus several harmonics and since it is not sinusoidal it cannot be added to the voltage induced in coil 60. Upon passing this rectified current through filter 111, however, the harmonics are removed and only the fundamental remains. The fundamental as designated by the curves 121, 122 and 123 in the graph shown in Fig. 12 is sinusoidal and is in phase with the voltage induced in coil 60.

The method of controling the grid bias will now be apparent. When the variable condenser 97 is in resonance with the oscillator, the maximum voltage as indicated by curve 121 will be impressed on resistor 38 and current will flow from resistance element 23 to resistance element 24. The grid 12 will thus become positive with respect to its cathode and the motor will be operated at its maximum speed in one direction. When the variable condenser is so set that the voltage across resistor 38 is equal to the voltage across coil 60 as indicated by the curve 122, no current will flow, the grid bias of both tubes will be zero or negative and the motor will be at rest. On the other hand when the variable condenser 97 is adjusted so that the voltage impressed across the resistor 38 is less than that induced in coil 60, as indicated by the curve 123, current will flow from resistance element 24 to resistance element 23 and the grid 15 will be positive with respect to its cathode. The motor will therefore be operated in the opposite direction. The speed at which the motor is operated will depend upon how much the voltage is above or below the line 122 which is regulated by variable condenser 97.

In Figs. 9 and 11 instead of utilizing the variable condenser 97 to adjust the voltage, the variable condensers 90 and 91 of the oscillator may be adjusted, as will be readily understood.

Figure 13:
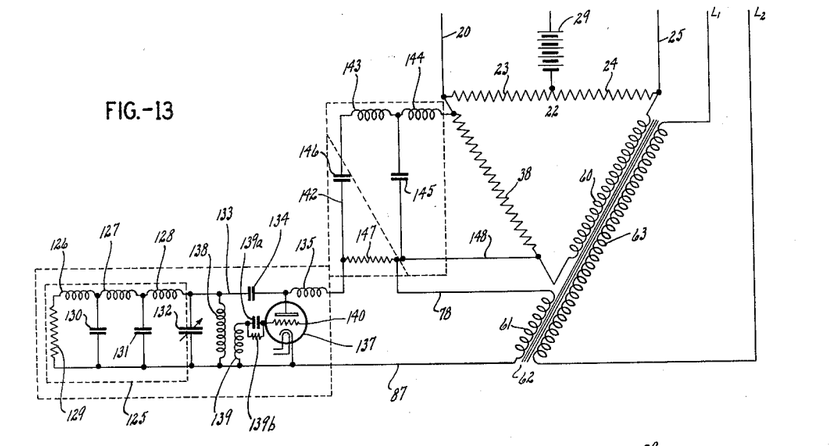
Fig. 13 is a circuit showing an oscillator of a modified type for controlling the grid bias.

In Fig. 13 of the drawings, additional means is disclosed for varying the voltage across resistor 38 in which the secondary coil 61 is connected to an oscillating circuit including a filter 125 comprising inductance coils 126, 127 and 128, a resistor 129 and condensers 130 and 131. The oscillator circuit also includes a variable condenser 132, inductance coils 138 and 139, a plate blocking condenser 134 and a radio frequency choke coil 135. Inductance coil 138 is connected between conductors 133 and 87 and inductance coil 139 leads from conductor 87 to the grid 140 of a vacuum tube 137 through a grid condenser 139a and grid resistor 139b. The terminal of coil 135 is connected through a conductor 142 and a condenser 146 with a low pass filter including inductance coils 143 and 144 and a condenser 145. The other terminal of coil 144 is connected to one terminal of the resistor 38. The conductor 78 leading from the other terminal of the secondary winding 61 is connected through a resistor 147 to conductor 142 and to the other terminal of resistor 38 through conductor 148.

The circuit as above described is a fundamentally tuned oscillator circuit. Such a system is capable of generating a certain amount of power which causes it to draw a proportional amount of plate current from the secondary coil 61. The power output of the oscillator is coupled to resistor 129 through the medium of the low pass filter 125. The resistor 129, however, is of such a low value that when the attenuation of the filter is near zero or the transmission of power is at a maximum, the resistor tends to draw a load far greater than the oscillator is capable of supplying, thereby causing it to cease oscillation. This cessation of oscillation is accompanied by a large decrease in the plate current.

Figure 14:
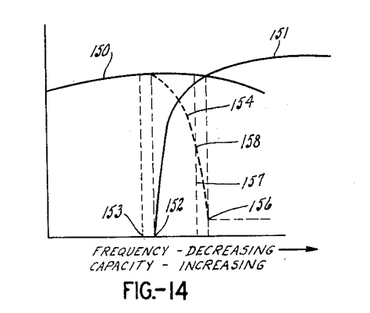
Fig. 14 is a graph in which the curves show the relationship between voltage, frequency and capacity in the circuit shown in Fig. 13.

To further explain this action, the characteristics of the circuit functions are plotted against frequency in Fig. 14 of the drawings in which curve 150 is the characteristic of the normal plate current. Curve 151 designates the characteristics of the low pass filter designed to start to transmit at the point 152 on the frequency line. If the oscillator frequency is tuned by the variable condenser 132 and coil 138 at some point to the left of 152, say at the point 153, any further decrease in frequency caused by the increase of capacity of condenser 132 will throw the frequency into the transmission region of the filter, thereby causing the resistor 129 to overload the oscillator. In such a case the plate current instead of pursuing its normal course along the line 150 will fall off prematurely along the line 154 to a value designated by the point 156. In other words, the action of the filter is like that of a switch which connects the resistor 129 across the oscillator when the frequency is low and disconnects it when the frequency is high.

In the operation of the circuit voltage is supplied to the resistor 38 by the operation of the variable condenser 132 to shift the frequency to any point between 152 and the point 156 as indicated in Fig. 14. Thus it will be seen that when condenser 132 is so adjusted that the oscillation frequency is tuned to the point 152, the difference of potential across resistor 38 is of the maximum value and is greater than the voltage induced in coil 60. The grid 12 will thus become positive with respect to its cathode and the motor will be operated in one direction at a speed depending upon the voltage. When the condenser is so adjusted that the oscillator frequency is tuned at a point indicated by the numeral 157 on the curve a condition exists in which the voltage across resistor 38 and coil 60 are equal. The grid bias of both tubes will therefore be equal and the motor will be at rest. When the circuit is so tuned that the oscillation frequency is at the point 156, the voltage induced in the coil 60 is greater than the voltage across the resistor 38, grid 15 will therefore become positive with respect to its cathode and the motor will be operated in the opposite direction, the speed being determined by the excess of the coil voltage over the difference of potential across the resistor, the minimum being at the point 158 and the maximum at the point 156. In this method of controlling the capacity it is not necessary to depend upon a resonance loop or a similar characteristic. In previous control systems it has heretofore been necessary to provide mechanical stops to prevent the condenser from travelling over on the other side of the curve, thus giving the reverse action to that desired on the circuit side of the characteristic. With the circuit shown in Fig. 13, however, there will be no reverse side to control, as fully explained in my copending application Ser. No. 697,757, filed on November 13, 1933.

Figure 15:
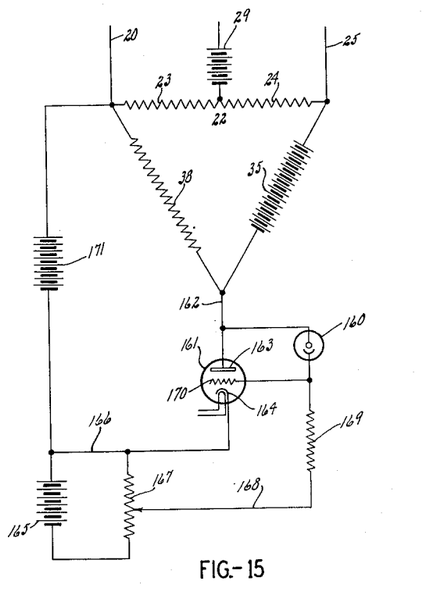
Fig. 15 is a circuit in which a photoelectric cell is utilized for controlling the grid bias.

In Fig. 15 of the drawings another means is disclosed for adjusting the potential across resistor 38 to control the grid bias of the tube in which a photoelectric cell 160 is employed to control the operation of a vacuum tube 161. In this circuit a conductor 162 leads from the junction of the battery 35 and the resistor 38 to the plate 163 of an amplifier tube 161. The cathode 164 of the tube is connected to the positive side of battery 165 by means of conductor 166. A potentiometer 167 connected to conductor 166 leads to the negative side of battery 165 and an adjustable conductor 168 leads through the resistor 169 to grid 170 and to the negative terminal of the photoelectric cell 160. An additional battery 171 is connected to one terminal of the resistor 22 and to the conductor 166.

Figure 16:
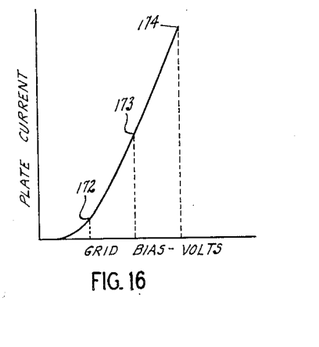
Fig. 16 is a graph showing the relationship between the plate current of the tube controlled by the photoelectric cell and the grid voltage.

In the operation of this circuit when the photoelectric cell 160 is dark, the grid 170 of the amplifier tube will have a negative potential with respect to the cathode 164 as determined by the setting of potentiometer 167, such as at a point 172 indicated on the curve shown in Fig. 16. When light falls on the cell 160, however, current flows from the positive terminal of battery 171 through the resistor 38, cell 160, resistor 169 and potentiometer 167 to the negative terminal of battery 165. This flow of current causes a voltage drop over the grid resistor 169 and causes the grid to become positive with respect to the cathode 164. An increased current therefore flows through the amplifier tube 161 and resistor 38. From Fig. 16 it will be noted that the current change in the output of the amplifier tube 161 will be linear with respect to light except at the two extremes of bias voltage. If the amplifier is operated on the straight part of the characteristic and a grid resistor 169 is employed, the resistance of which does not change with change in voltage, when the cell 160 is dark the voltage on resistor 38 will be at its minimum value which is less than the voltage of battery 35. The grid bias of tube 10 will therefore be positive with respect to its cathode and the motor will be operated at its maximum speed in one direction. When the light of cell 160 is so adjusted that the resultant operation of the circuit is to produce a voltage on resistor 38 which is equal to the battery voltage as indicated at 173 in Fig. 16, neither tube 6 nor tube 10 will operate to pass current and the motor will be at rest. If the light on cell 160, however, is intensified, the resultant operation of the circuit will cause the voltage across resistor 38 to be of a maximum value, as indicated at 174 in Fig. 16, which is greater than the voltage of battery 35. A maximum amount of current will pass through the tube 6 and the motor will be operated at the maximum speed in the opposite direction. The speed of the motor may be varied by adjusting the light on cell 160 so that the grid bias voltage will lie between the points 173 and 172 or between the points 173 and 174, the maximum speed occurring when the grid bias voltage is at point 172 or 174.

From the foregoing specification it will be apparent that I have provided an improved circuit in which direct current motors may be operated from an alternating source of power in either direction and at the desired speed.

It will also be apparent that various means have been provided which are simple and effective for controlling the grid bias and thereby controlling the operation of the motor.

To those skilled in the art, many modifications and widely different embodiments and applications of my invention will suggest themselves without departing from the spirit and scope thereof. My disclosure and the description herein are purely illustrative and are not to be considered in any sense limiting.

What I claim is:

1. A circuit for controlling the operation of a direct current motor from an alternating source of power comprising an ignition controlled discharge tube having an anode, a cathode and a grid, the anode being connected to said motor, an alternating source of power connected to said motor and to the cathode of said tube whereby the anode of said tube is maintained at a positive potential with respect to its cathode during the positive half of the alternating current cycle, means including an alternating source of power and a negative direct current source of power for maintaining the grid of said tube at a negative or zero potential with respect to the cathode, thereby preventing the discharge of said tube and maintaining the motor at rest, and means for supplying additional alternating current potential in phase with the anode-cathode source of potential to said grid from an alternating source of power whereby the tube will be discharged and a circuit will be established to supply current to said motor.

2. A circuit for controlling the operation of a direct current motor from an alternating source of power comprising an ignition controlled discharge tube having a cathode, a grid and an anode, the anode being connected to said motor, an alternating source of power connected to said motor and to the cathode of said tube whereby the anode of said tube is maintained at a positive value with respect to its cathode during the positive half of the alternating current cycle, means including a negative direct current voltage and an alternating current voltage in displaced phase relation with the anode voltage and the maximum voltage of which is equal to the direct current voltage, for maintaining the grid of said tube at a negative or zero potential with respect to its cathode, thereby preventing the discharge of said tube and maintaining the motor at rest, means for supplying an alternating current potential to said grid in phase with the anode voltage to change its potential to a positive value with respect to its cathode and means for varying the amount of positive potential of the grid with respect to its cathode, thereby regulating the speed of said motor.

3. A circuit for controlling the direction and speed of a series wound direct current motor having a double field from an alternating source of power, comprising a pair of ignition controlled discharge tubes, each having a cathode, a grid and an anode, and the anode of each tube being connected to separate fields of said motor, a source of alternating current connected to the cathodes of said tubes and to the motor whereby a positive potential is established between the anode of each tube and the respective cathodes during the positive half of the alternating current cycle, means including an alternating source of power in displaced phase relation to the anode voltage and a negative direct current source of power for maintaining the grids of each of said tubes at a negative or zero potential with respect to its cathode whereby the motor may be maintained at rest, additional means for alternatively supplying an alternating current potential in phase with the plate voltage to each of said grids, thereby alternatively establishing a circuit through each of said tubes for operating the motor in different directions and means for varying the amount of additional potential supplied to each tube whereby the speed of the motor may be varied in either direction.

4. A circuit for controlling the operation of a direct current motor from an alternating source of power comprising an ignition controlled discharge tube having an anode, a grid and a cathode, the anode of which is connected to said motor, an alternating source of power connected to said motor and to the cathode of said tube, whereby the anode of said tube is maintained positive with respect to its cathode during the positive half of the alternating current cycle, means for maintaining the grid of said tube at a negative or zero potential with respect to its cathode, thereby preventing the discharge of said tube when the motor is at rest, means including a source of potential initiated by a photoelectric cell for supplying sufficient additional potential to the grid of said tube to change its potential from a negative or zero to a positive value with respect to its cathode, thereby establishing a circuit to operate the motor.

5. A circuit for controlling the operations of a direct current motor from an alternating current source of power, comprising a series wound direct current motor having a double field, a pair of ignition controlled discharge tubes each having an anode, a grid and a cathode, the anode of each of said tubes being connected to one of the fields of said motor, means for impressing a voltage from an alternating source of power upon the anodes of said tubes, a divided resistor, the opposite terminals of which are connected to the grid of each tube, an alternating source of power in displaced phase relation to the anode voltage and a fixed negative direct current source of power connected in series intermediate the divided resistor for maintaining the bias of said tubes at a potential varying from a negative to a zero value, and means for alternatively changing the potential at opposite sides of said resistor whereby the grid of each of said tubes may be alternatively rendered positive with respect to its cathode and the motor operated alternatively in opposite directions.

6. A circuit for controlling the operations of a direct current motor from an alternating current source of power, comprising a series wound direct current motor having a double field, a pair of ignition controlled discharge tubes, each having an anode, a grid and a cathode, the anode of each of said tubes being connected to one of the fields of said motor, means for impressing a voltage from an alternating source of power upon the anodes of said tubes, a divided resistor, the opposite terminals of which are connected to the grid of each tube, means including an alternating source of power in displaced phase relation with the anode voltage and a fixed negative direct current source of power connected intermediate the divided resistor for maintaining the grid bias of each of said tubes at a negative or zero value, means for supplying positive voltage to the opposite sides of said resistor to alternatively change the grid bias of each tube from a negative to a positive value and to alternatively rotate the motor in opposite directions, and means for varying the amount of positive voltage which is alternatively supplied at opposite sides of the divided resistor to vary the speed of said motor.

7. A circuit for controlling the operation of a direct current motor from an alternating current source of power, comprising a series wound direct current motor having a double field, a pair of ignition controlled discharge tubes each having an anode, a grid and a cathode, the anodes of said tubes being connected to opposite fields of said motor, means for impressing a voltage from an alternating source of power upon the anodes of said tubes, a single alternating source of power in displaced phase relation to the anode voltage and a fixed negative direct current source of power connected to the grids of both tubes for maintaining the bias of both of said tubes at a potential varying from a negative to a zero value, and means including two sources of potential opposing each other, one of which is variable for selectively changing the grid potential of each of said tubes in a positive direction sufficiently to permit alternate discharge of said tubes, whereby the motor may be alternatively operated in opposite directions.

8. A circuit for controlling the operation of a direct current motor from an alternating current source of power, comprising a series wound direct current motor having a double field, a pair of ignition controlled discharge tubes each having an anode, a grid and a cathode, the anodes of said tubes being connected to opposite fields of said motor, means for impressing a voltage from an alternating source of power upon the anodes of said tubes, a second single alternating source of power in displaced phase relationship with the anode voltage and a fixed negative direct current source of power in series with each other and being electrically connected to the grids of both of said tubes, the positive peak value of the second source of alternating power being approximately just sufficient to prevent the discharge of either of said tubes when it is opposing the direct current, whereby the bias of both of said tubes is maintained at a potential varying from a negative to a zero value and the motor is maintained at rest, and means including two sources of potential opposing each other, one of which is variable for selectively changing the grid potential of each of said tubes in a positive direction in varying amounts to permit alternate discharge of said tubes, whereby the motor may be operated alternatively in opposite directions at the desired speeds.

9. A circuit for controlling the operation of a direct current motor from an alternating source of power, comprising a direct current motor having a double field, a pair of discharge tubes each having an anode, a grid and a cathode, the anode of each of said tubes being connected to opposite fields of said motor, means for impressing a voltage from an alternating source of power upon the anodes of said tubes, means for maintaining the grid of said tubes at a negative or zero potential with respect to its cathode, thereby preventing the discharge of said tubes and maintaining the motor at rest, a substantially constant direct current source of power having its positive terminal connected to one of said grids for suplying additional potential thereto, and an oscillator and receiver capable of generating direct current at variable voltages for alternately supplying additional potential to the other grid, the voltage from said oscillator and receiver being electrically connected to oppose the voltage from the substantially constant direct current source of power, whereby the motor may be maintained at rest or operated in alternatively reverse directions and at a speed dependent upon the direct current voltage generated by said oscillator and receiver.

10. A circuit for controlling the operation of a direct current motor from an alternating source of power, comprising a direct current motor having a double field, a pair of discharge tubes each having an anode, a grid and a cathode, the anode of each of said tubes being connected to opposite fields of said motor, means for impressing a voltage from an alternating source of power upon the anodes of said tubes, means for maintaining the grid of said tubes at a negative or zero potential with respect to its cathode, thereby preventing the discharge of said tubes and maintaining the motor at rest, an alternating current source of power in phase with the anode voltage for supplying additional voltage to one of said grids, and means including an oscillator, receiver and filter for supplying additional voltage to the other grid, said oscillator and receiver being capable of generating variable voltages which when passed through said filter provide voltages which are in phase with the plate voltage, the voltage from said oscillator and receiver being electrically connected to oppose the voltage from said grid alternating current source of power, whereby the motor may be maintained at rest or operated in alternately reverse directions and at a speed depending upon the direct current voltage generated by said oscillator and receiver.

RICHARD E. CONOVER.